(12) United States Patent
Moeggenborg et al.

(10) Patent No.: US 11,262,178 B2
(45) Date of Patent: Mar. 1, 2022

(54) ANGLE MEASUREMENT APPARATUS

(71) Applicants: Howard R. Moeggenborg, Alma, MI (US); Gordon M. Moeggenborg, Shepherd, MI (US)

(72) Inventors: Howard R. Moeggenborg, Alma, MI (US); Gordon M. Moeggenborg, Shepherd, MI (US)

(73) Assignee: County Line Concepts, LLC, Mount Pleasant, MI (US)

( * ) Notice: Subject to any disclaimer, the term of this patent is extended or adjusted under 35 U.S.C. 154(b) by 0 days.

(21) Appl. No.: 16/787,527

(22) Filed: Feb. 11, 2020

(65) Prior Publication Data
US 2020/0256660 A1 Aug. 13, 2020

Related U.S. Application Data

(60) Provisional application No. 62/804,137, filed on Feb. 11, 2019.

(51) Int. Cl.
*G01B 5/24* (2006.01)
(52) U.S. Cl.
CPC ...................... *G01B 5/24* (2013.01)
(58) Field of Classification Search
CPC ............. G01B 5/24; G01B 3/563; B25H 7/00
USPC .......................................................... 33/471
See application file for complete search history.

(56) References Cited

U.S. PATENT DOCUMENTS

| | | | | |
|---|---|---|---|---|
| 4,599,806 A * | 7/1986 | Wright | ...................... | B25H 7/02 33/469 |
| 5,440,818 A * | 8/1995 | Mailhot | ................... | B25H 7/02 33/452 |
| 5,809,659 A * | 9/1998 | Martin | ..................... | E04F 21/26 33/418 |
| 6,049,990 A * | 4/2000 | Holland | .................... | B43L 7/02 33/464 |
| 6,453,568 B1 * | 9/2002 | Hymer | ................. | G01C 15/008 33/276 |
| 6,584,698 B1 * | 7/2003 | Liu | ......................... | B27B 27/08 33/468 |
| 6,895,675 B2 * | 5/2005 | Albright | ................. | B26B 29/06 33/418 |
| 6,954,990 B2 * | 10/2005 | Ellis | ....................... | G01B 3/563 33/424 |
| 7,228,636 B1 * | 6/2007 | Moore | ..................... | B43L 7/02 33/417 |
| 7,240,437 B1 * | 7/2007 | Moldovan | .............. | B25H 7/005 33/286 |
| 2004/0143979 A1 * | 7/2004 | Albright | ................. | B26B 29/06 33/42 |
| 2004/0216316 A1 * | 11/2004 | Ellis | ....................... | G01B 3/563 33/471 |

(Continued)

*Primary Examiner* — Yaritza Guadalupe-McCall
(74) *Attorney, Agent, or Firm* — Poznak Dyer Kanar Schefsky Thompson PLC; Robert C. Corbett

(57) ABSTRACT

An angle measurement apparatus for use with a panel such as siding is provided. The apparatus includes a base portion defining a locating feature that is engageable with a reference feature on the panel. An arm portion is rotatably mounted with respect to the base portion such that the arm portion is selectively rotatable with respect to the base portion about an axis. The arm portion can thus be rotated to form a desired angle with the base portion, and, correspondingly, with the panel.

10 Claims, 4 Drawing Sheets

(56) References Cited

U.S. PATENT DOCUMENTS

| | | | |
|---|---|---|---|
| 2009/0025238 A1* | 1/2009 | Bowman | E04F 21/26 33/472 |
| 2018/0023934 A1* | 1/2018 | Gjertsen | G01B 3/563 33/809 |
| 2020/0256660 A1* | 8/2020 | Moeggenborg | G01B 3/563 |

* cited by examiner

ANGLE MEASUREMENT APPARATUS

CROSS-REFERENCE TO RELATED APPLICATION

This application claims the benefit of U.S. Provisional Application No. 62/804,137, filed Feb. 11, 2019, and which is hereby incorporated by reference in its entirety.

TECHNICAL FIELD

This disclosure relates to devices for measuring angles during building construction, repair, and maintenance.

BACKGROUND

Panels, such as panels of siding, often have to be cut at angles in order to form a desired shape, such as at rooflines. Typically, to form a cut line where the panel is to be cut, two points are marked on the panel and a chalk line is formed between the two points. This process requires two people to implement and leaves a chalk residue on the panel.

SUMMARY

An angle measurement apparatus for use with a panel such as siding is provided. The apparatus includes a base portion defining a locating feature that is engageable with a reference feature on the panel. An arm portion is rotatably mounted with respect to the base portion such that the arm portion is selectively rotatable with respect to the base portion about an axis. The arm portion can thus be rotated to form a desired angle with the base portion, and, correspondingly, with the panel. A cutting line may then be scribed on the panel along a straight edge or surface of the arm portion. A corresponding method is also provided.

The above features and advantages and other features and advantages of the present disclosure are readily apparent from the following detailed description of the best modes for carrying out the disclosure when taken in connection with the accompanying drawings

DESCRIPTION OF THE PREFERRED EMBODIMENTS

Figure 1:
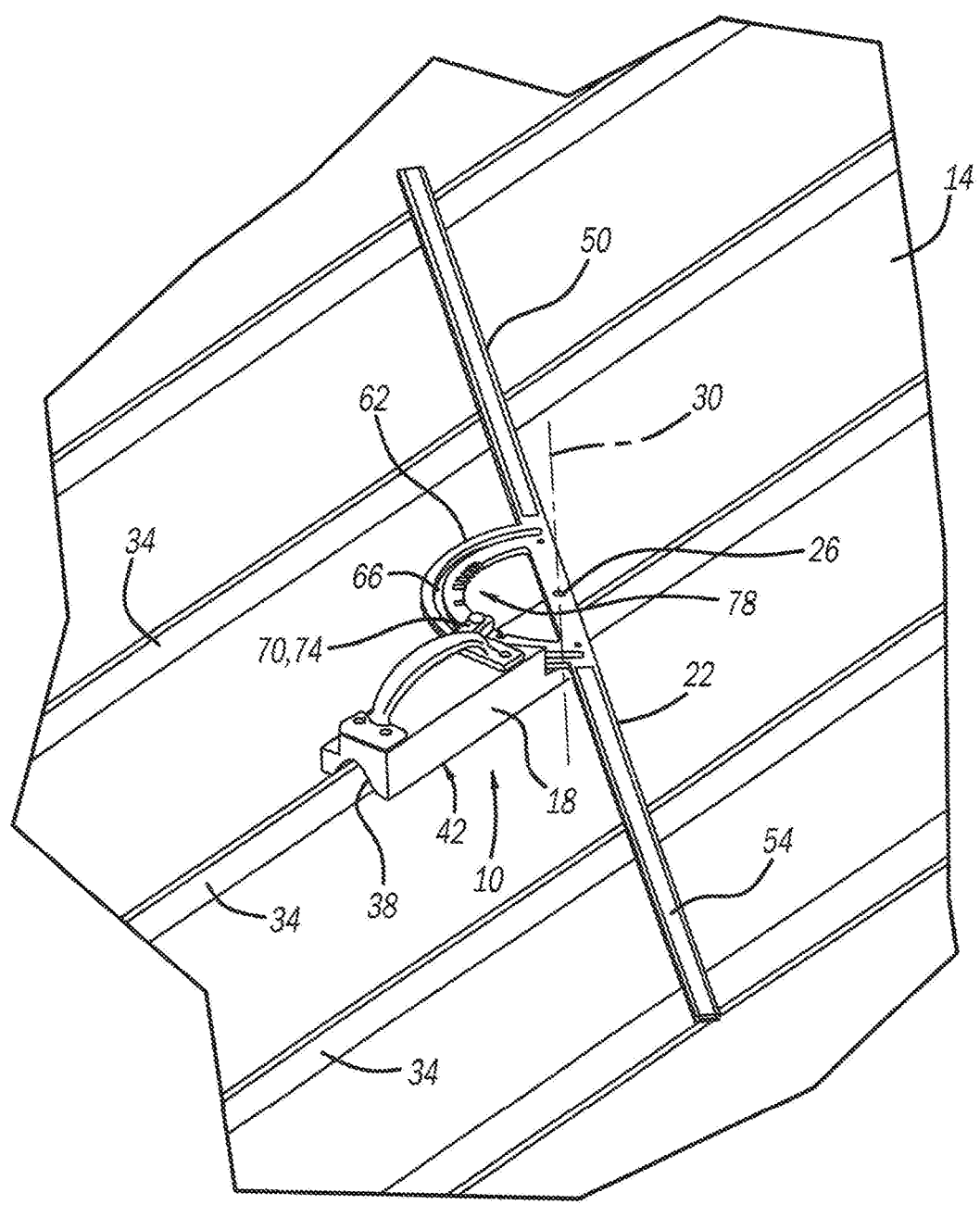
FIG. 1 is a schematic, perspective view of an angle measurement apparatus in use with a panel.

Referring to FIG. 1, an angle measurement apparatus 10 for use with a panel 14 is schematically depicted. The angle measurement apparatus 10 includes a base portion 18 and an arm portion 22. The arm portion 22 is rotatably mounted with respect to the base portion 18, such as via a pivot pin 26. Accordingly, the arm portion 22 is selectively rotatable with respect to the base portion 18 about a pivot axis 30.

The base portion 18 defines a locating feature that is engageable with a reference feature on the panel 14. In the embodiment shown in FIG. 1, the panel 14 defines a plurality of ridges or ribs 34; one of the ridges or ribs 34 is the reference point or reference feature on the panel 14. The locating feature is a groove 38 formed in the bottom surface 42 of the base portion 18.

The arm portion 22 also includes a first member 46 that partially defines two arms 50, 54. Arms 50, 54 extend on respective opposite sides of the axis 30. Each arm 50, 54 is selectively variable in length. More specifically, and with reference to FIG. 2, in which like reference numbers refer to like components from FIG. 1, the arm portion 22 includes a second member 58. The first member 46 defines a C-shaped cross-section which forms a channel at both arms (only one of which is shown at 50 in FIG. 2). The second member 58 is disposed within the channel such that movement of the second member 58 with respect to the first member 46 is limited to linear translation. Accordingly, the length of the arm 50 is selectively variable by moving the second member 58 relative to the first member 46, such as to the position shown in phantom at 58A. A locking feature (not shown) may be employed to lock the second member 58 with respect to the first member 46. A third member (not shown) is similarly attached to the other arm 54 so that the length of arm 54 is also selectively variable.

The arm portion 22 also includes an arc portion 62 operatively connected to the arms 50, 54. The arc portion 62 is the arc of a circle having the axis 30 and pivot pin 26 at its center. The arc portion 62 defines an arc-shaped slot 66 that extends across the arc portion 62 and has the axis 30 at its center point. A cam lock or latch device 70 is mounted to the base member 18, and a portion of the device 70 extends through the slot 66. The device 70 includes a lever 74 that is rotatable to selective engage the device 70. The device 70, when engaged, clamps the arm portion 22 with respect to the base portion 18, thereby preventing rotation of the arm portion 22.

The arc portion 66 includes markings that indicate the angle formed between the base portion 18 and the arm portion 22. In the embodiment depicted, the markings are notches 78 formed in the arc portion 66, though other markings may be employed within the scope of the claims.

To use the apparatus 10, the base portion 18 is positioned so that one of the ridges or ribs 34 at least partially enters the groove 38 as shown. The rib 34 thus functions as a reference location on the panel 14, which may, for example, be siding for a house or other structure. The angle measured by the apparatus 10 is thus measured with respect to the rib 34. The arm portion 22 is then rotated with respect to the base portion 18 until the notch 78 representing the desired angle is aligned with a feature on the base portion 18, such as the cam latch device 70. The cam latch device 70 is then engaged to clamp the arm portion 22 and prevent its rotation. The arms 50, 54 may be extended (i.e., by sliding the second member 58 with respect to the first member 46) to a desired length. A line is then scribed on the panel 14 using the arms 50, 54 as a guide.

Figure 2:
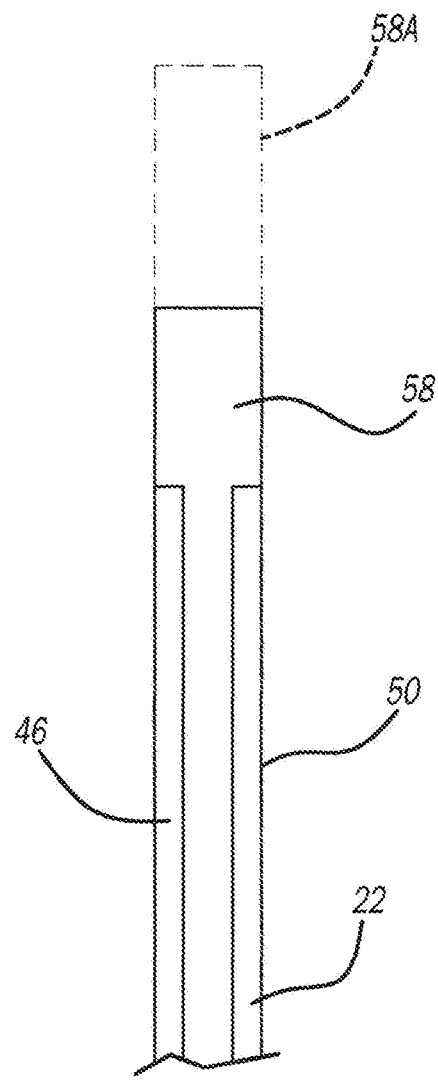
FIG. 2 is a schematic, bottom view of a portion of one of the arms of the angle measurement apparatus of FIG. 1.
Figure 3:
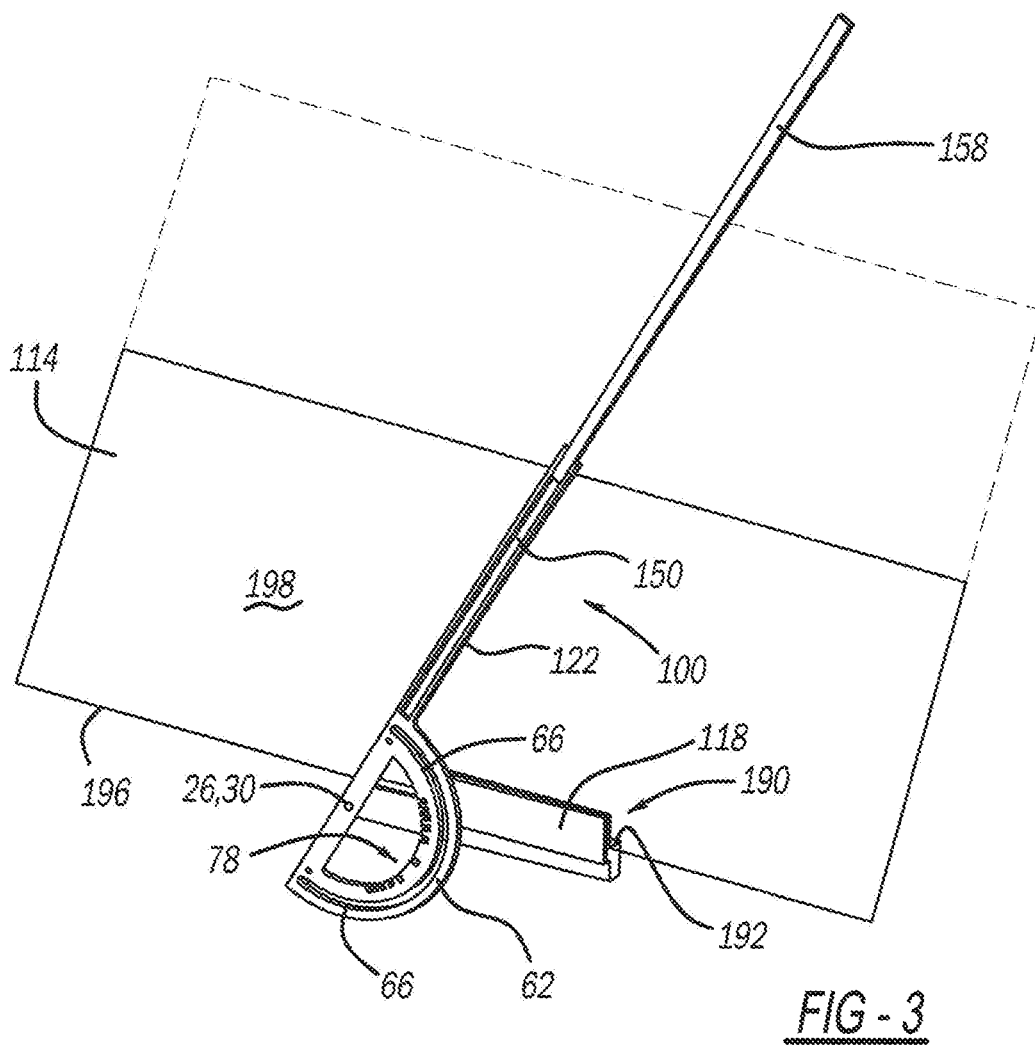
FIG. 3 is a schematic, perspective view of an alternative embodiment of the angle measurement apparatus.
Figure 4:
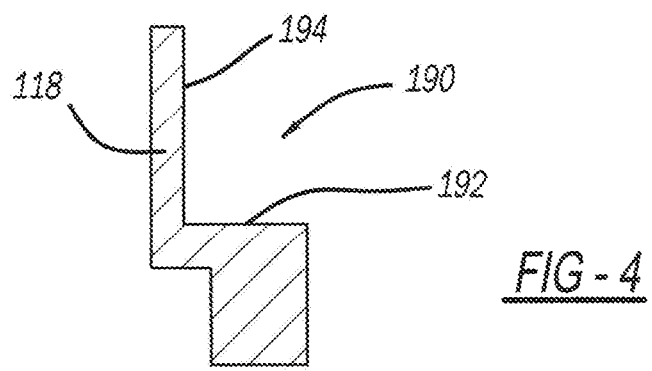
FIG. 4 is a cross-sectional side view of the base portion of the angle measurement apparatus of FIG. 3.

Referring to FIGS. 3 and 4, wherein like reference numbers refer to like components from FIGS. 1 and 2, a second angle measurement apparatus 100 is schematic depicted. The angle measurement apparatus 100 is similar to the angle measurement apparatus of FIG. 1, except that base portion 118 has a different locating feature configured to engage a different reference point on panel 114, and arm portion 122 includes only a single arm 150 with a slidable member 158 to adjust the length.

Base portion 118 defines a notch 190. More specifically, the notch is defined by a first surface 192 and a second surface 194 perpendicular to the first surface 192. The use of the apparatus 100 is substantially similar to the use of apparatus 10, except that surface 192 is placed in abutting contact with the edge 196 of the panel 114, and surface 194 is placed in contact with the face 198 of the panel 114. Accordingly, the edge 196 functions as the reference, and angle measurements are relative to the edge 196. The cam latch device is not shown in FIG. 3 but extends through the slot 66.

Figure 5:
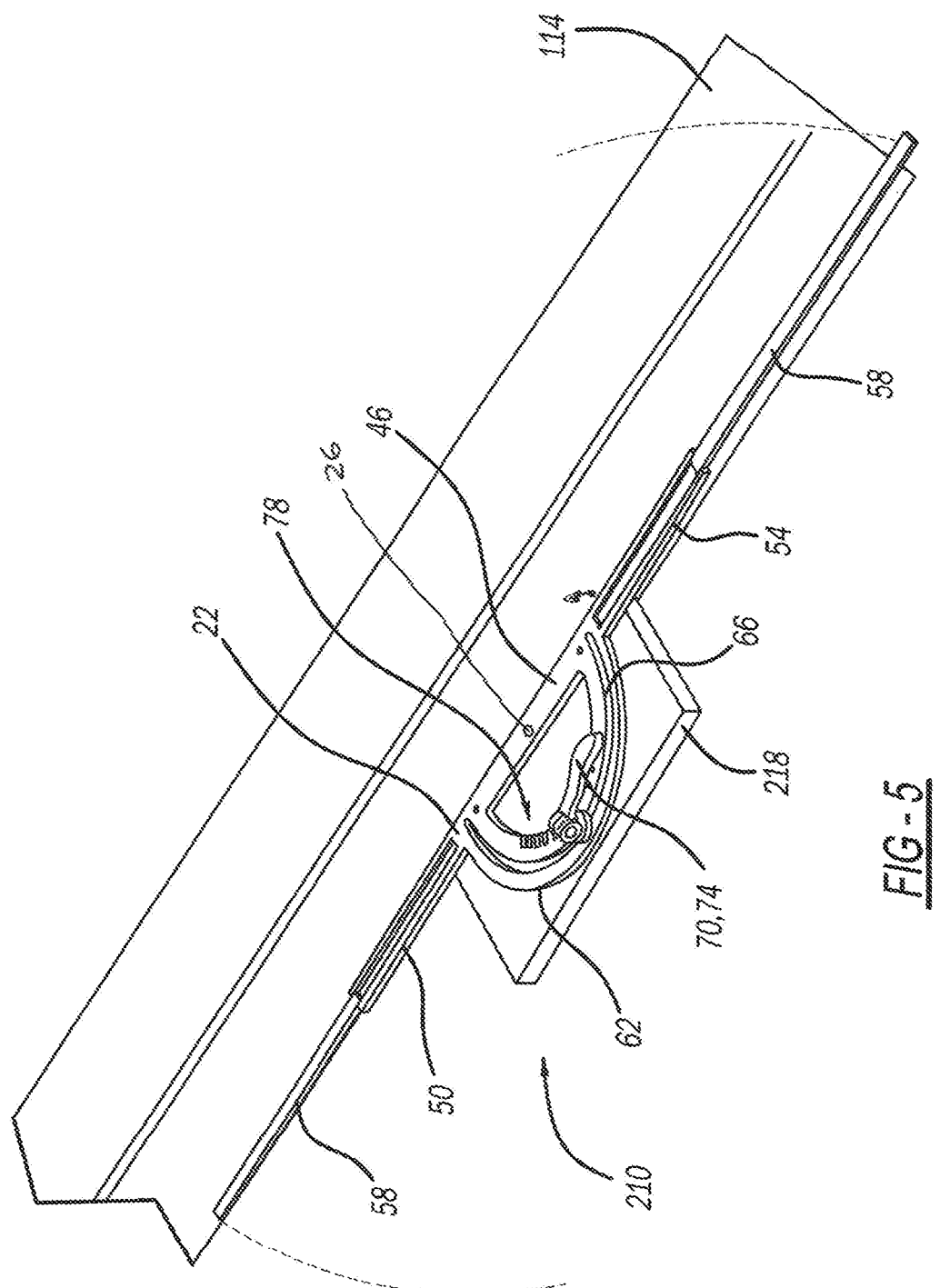
FIG. 5 is a schematic, perspective view of yet another alternative embodiment of the angle measurement apparatus.

Referring to FIG. 5, wherein like reference numbers refer to like components from FIGS. 1-4, yet another angle measurement apparatus 200 is schematically depicted. The apparatus 200 is substantially identical to the apparatus shown at 10 in FIG. 1, except that the base portion 218 is a rectangular block with a planar edge that abuts the edge of the panel 114 to provide a reference point.

While the best modes for carrying out the invention have been described in detail, those familiar with the art to which this invention relates will recognize various alternative designs and embodiments for practicing the invention within the scope of the appended claims.

The invention claimed is:

1. An angle measurement apparatus for use with a panel defining a plurality of ridges or ribs, the apparatus comprising:
    a base portion defining a groove formed in the bottom surface of the base portion;
    an arm portion rotatably mounted with respect to the base portion such that the arm portion is selectively rotatable with respect to the base portion about an axis;
    wherein the base portion is positionable relative to the panel such that one of the ridges or ribs at least partially enters the groove; and
    wherein the arm portion is positioned relative to the base portion such that, when one of the ridges or ribs at least partially enters the groove, the axis intersects the panel and the arm portion is substantially parallel to the panel.

2. The angle measurement apparatus of claim 1, further comprising markings on one of the base portion and the arm portion indicating the angle formed between the base portion and the arm portion.

3. The angle measurement apparatus of claim 1, wherein the arm portion has a length that is selectively variable.

4. The angle measurement apparatus of claim 3, wherein the arm portion includes a first member that is rotatably mounted with respect to the base portion, and a second member being slidably connected to the first member; and
    wherein the length of the arm portion is variable by sliding the second member with respect to the first member.

5. The angle measure apparatus of claim 1, wherein the arm portion defines a slot that is an arc of a circle having the axis at its center; and
    wherein the angle measurement apparatus further includes a member mounted to the base portion and extending through the slot.

6. The angle measurement apparatus of claim 5, wherein the member is part of a cam lock device configured to selectively clamp the arm portion with respect to the base portion.

7. A method comprising:
    possessing an angle measurement apparatus including a base portion defining a locating feature that is engageable with a reference feature on a panel, and an arm portion rotatably mounted with respect to the base portion such that the arm portion is selectively rotatable with respect to the base portion about an axis;
    engaging the locating feature with a reference point on the panel; and
    rotating the arm portion such that the arm portion forms a desired angle with the base portion and the panel;
    wherein the locating feature is a groove formed on the bottom surface of the body portion;
    wherein the panel defines a plurality of ridges or ribs;
    wherein the reference point on the panel is one of the ridges or ribs; and
    wherein said engaging the locating feature with a reference point on a panel includes inserting the ridge or rib at least partially into the groove.

8. The method of claim 7, further comprising changing the length of the arm portion.

9. The method of claim 8, wherein said changing the length of the arm portion includes sliding a first member with respect to a second member of the arm portion.

10. The method of claim 7, further comprising drawing a line on the panel using a flat surface of the arm portion as a guide.

* * * * *